United States Patent [19]
Hosoe et al.
[11] Patent Number: 4,622,264
[45] Date of Patent: Nov. 11, 1986

[54] GARNET FILM FOR MAGNETIC BUBBLE MEMORY ELEMENT

[75] Inventors: Yuzuru Hosoe, Hachioji; Norio Ohta, Sayama; Keikichi Andoo, Musashino; Yutaka Sugita, Tokorozawa, all of Japan

[73] Assignee: Hitachi, Ltd., Tokyo, Japan

[21] Appl. No.: 543,423

[22] Filed: Oct. 19, 1983

[30] Foreign Application Priority Data

Oct. 20, 1982 [JP] Japan ................................ 57-182851

[51] Int. Cl.⁴ ............................................. B32B 00/00

[52] U.S. Cl. ................................ 428/332; 252/62.57; 365/33; 428/336; 428/692; 428/693; 428/697; 428/700; 428/701; 428/702; 428/900

[58] Field of Search ........................... 365/33, 32, 2, 3; 428/692, 700, 900, 701, 702, 332, 336, 693, 697; 252/62.57, 62.58, 62.63

[56] References Cited

U.S. PATENT DOCUMENTS

| | | | |
|---|---|---|---|
| 3,838,450 | 9/1974 | Bongers et al. | 252/62.57 |
| 3,947,372 | 3/1976 | Shinagawa | 252/62.57 |
| 4,125,473 | 11/1978 | Sronssi | 252/62.63 |
| 4,183,999 | 1/1980 | Ota et al. | 428/693 |
| 4,263,374 | 4/1981 | Glass et al. | 252/62.58 |
| 4,333,991 | 6/1982 | Sakurai | 252/62.57 |
| 4,419,417 | 12/1983 | Le Craw | 428/693 |
| 4,433,034 | 2/1984 | Gualtieri et al. | 428/702 |
| 4,434,212 | 2/1984 | Robertson et al. | 428/702 |
| 4,435,484 | 3/1984 | Breed et al. | 428/702 |
| 4,516,222 | 5/1985 | Sakurai et al. | 365/32 |
| 4,568,618 | 2/1986 | Uchishiba et al. | 428/702 |
| 4,581,717 | 4/1986 | Kaneko | 365/122 |

OTHER PUBLICATIONS

Calhoun et al., IBM Technical Disclosure Bulletin, vol. 14, No. 7, Dec. 1971, p. 2220.

Randles; "Liquid Phase Epitaxial Growth of Magnetic Garnets", pp. 72–96 of Crystal, Springer-Varlag, NY 1978.

*Primary Examiner*—George F. Lesmes
*Assistant Examiner*—William M. Atkinson
*Attorney, Agent, or Firm*—Antonelli, Terry & Wands

[57] ABSTRACT

A garnet film for use in magnetic bubble devices that supports magnetic bubbles with a bubble diameter of 0.4 micron or less. The curie temperature can be made over 240° C., and the garnet film used is suitable for ion implanted devices.

6 Claims, 5 Drawing Figures

GARNET FILM FOR MAGNETIC BUBBLE MEMORY ELEMENT

BACKGROUND OF THE INVENTION

The present invention relates to a garnet film for magnetic bubble memory devices, and more particularly to a magnetic bubble element garnet film ideally suited for supporting small magnetic bubbles with a diameter of 0.4 micron or less.

It is known that, to reduce the bubble diameter in garnet material used in magnetic bubble memory devices, the saturation induction $4\pi Ms$ need only be increased. To reduce the bubble diameter down to 0.4 micron or less, $4\pi Ms$ must be set at no less than about 1900G. However, the majority of the saturation magnetization (Ms) of iron garnet arises through the difference between the magnetization of ferric ions occupying tetrahedral sites ($Fe^{3+}$; three ions in the composition formula) and the magnetization of ferric ions arranged in the opposite direction occupying octahedral sites ($Fe^{3+}$; two ions in the composition formula). Magnetic garnet films with the desired $4\pi Ms$ have hitherto been obtained through the substitution for tetrahedral iron ions ($Fe^{3+}$) of ions such as gallium ($Ga^{3+}$), aluminum ($Al^{3+}$), silicon ($Si^{4+}$), or germanium ($Ge^{4+}$) ions, which are strongly selective for tetrahedral sites.

It is therefore possible to reduce the bubble diameter by reducing the amount of ions such as $Ga^{3+}$, $Al^{3+}$, $Si^{4+}$, and $Ge^{4+}$ that replace the tetrahedral ferric ions ($Fe^{3+}$), and thereby increasing the $4\pi Ms$. For example, in $(SmLu)_3Fe_{5-Y}Ga_YO_{12}$ type garnet, a magnetic bubble garnet film with a $4\pi Ms$ of approximately 1800G is formed by reducing Ga amount y to zero (AIP Conference Proceedings, No. 29, 105–107, 1975). However, because the amount of tetrahedral ferric ion substitution in this garnet system cannot be made any smaller than this, it is impossible to make the $4\pi Ms$ any larger.

Another possible method of increasing $4\pi Ms$ is to substitute octahedral ferric ions with non-magnetic ions such as scandium ($Sc^{3+}$) that are strongly selective for octahedral sites. It is known, for example, that by increasing the Sc content Y from 0 to 0.7 in $Y_3Fe_{5-Y}Sc_YO_{12}$, the $4\pi Ms$ at absolute zero point increases about 50% (J. Appl. Phys. 37, 1408–1415, 1966). It is thought that substituting the octahedral ferric ions with non-magnetic ions will suffice for increasing the $4\pi Ms$ value above the 1800G obtained in $(SmLu)_3Fe_5O_{12}$ above. However, as shown in FIG. 1, actual measurements at room temperature (25° C.) of the $4\pi Ms$ of garnet film in which the octahedral ferric ions have been substituted with $Sc^{3+}$ show that $4\pi Ms$ hardly increases even when the Sc content y is increased. As shown in FIG. 2, this is because the Curie temperature ($T_c$) declines as the amount y of Sc increases; as a consequence of this, it is believed that the magnetic interaction between the ferric ions weakens, which is why the $4\pi Ms$ fails to increase.

SUMMARY OF THE INVENTION

The object of the present invention is to overcome the above problems and provide a magnetic garnet film for magnetic bubble devices that has a large saturation induction and is capable of supporting magnetic bubbles with a diameter of no more than 0.4 micron.

To attain said object, the present invention provides a garnet film having uniaxial anisotropy and a composition represented by the following general formula:

$$R_{3-x}Bi_xFe_{5-y}M_yO_{12}$$

where R is at least one element selected from the group consisting of yttrium, lanthanum, samarium, thulium, ytterbium, and lutetium; M is at least one element selected from the group consisting of scandium, indium and chromium; the values x and y lie within a region A enclosed by line segment a in FIG. 5 joining points 1 (0.2,0.3) and 2 (0.2,0.1), line segment b joining points 2 (0.2,0.1) and 3 (0.9,0.03), line segment c joining points 3 (0.9,0.03) and 4 (0.9,0.4), and line segment d joining points 4 (0.9,0.4) and 1 (0.2,0.1); and said garnet film is formed on the surface of (111) oriented non-magnetic garnet substrate.

The present invention increases the magnetic interaction between the ferric ions through the use of bismuth ions ($Bi^{3+}$). By so doing, the saturation induction at room temperature (25° C.) can be increased to 1900G or more with substitution for octahedral ferric ions of non-magnetic ions and the bubble diameters can be reduced to 0.4 micron or less.

The present invention is illustrated in greater detail through the use of the drawings and examples described below.

PREFERRED EMBODIMENTS OF THE INVENTION

It is known that when part of the yttrium ions ($y^{3+}$) occupying dodecahedral sites in yttrium-iron garnet ($Y_3Fe_5O_{12}$) are substituted with bismuth ($Bi^{3+}$), lead ($Pb^{2+}$), or other ions with large ionic radii, the Curie temperature becomes high. This effect is especially large when $Bi^{3+}$ is used. This rise in the Curie temperature suggests that the magnetic interaction between the ferric ions is increased by the presence of bismuth ions ($Bi^{3+}$). Therefore, in garnets in which octahedral ferric ions have been substituted with non-magnetic ions, it appears that if part of the ions occupying dodecahedral sites are substituted with busmuth ions ($bi^{3+}$), the magnetic interaction between the ferric ions is strengthened, increasing the $4\pi Ms$ at room temperature (25° C). However, the ions occupying dodecahedral sites generally have a magnetization whose direction is opposite to that of the magnetization of the tetrahedral ferric ions. This increases the $4\pi Ms$. Therefore, ions with small magnetization such as yttrium ($y^{3+}$), lanthanum $La^{3+}$), samarium ($Sm^{3+}$), thulium ($Tm^{3+}$), ytterbium ($Yb^{3+}$), lutetium ($Lu^{3+}$), and bismuth ($Bi^{3+}$) are suitable for occupation of dodecahedral sites. The presence of 0.7 or more ions each of $Sm^{3+}$ and $Lu^{3+}$ in the composition formula is especially desirable as this increases the magnetic anisotropy which stabilizes the bubbles. Scandium ($Sc^{3+}$), indium ($In^{3+}$), and chromium ($Cr^{3+}$) are excellent choices as non-magnetic ions that substitute for octahedral ferric ions because they have a strong selectivity for octahedral positions and do not require charge compensation.

Figure 1:
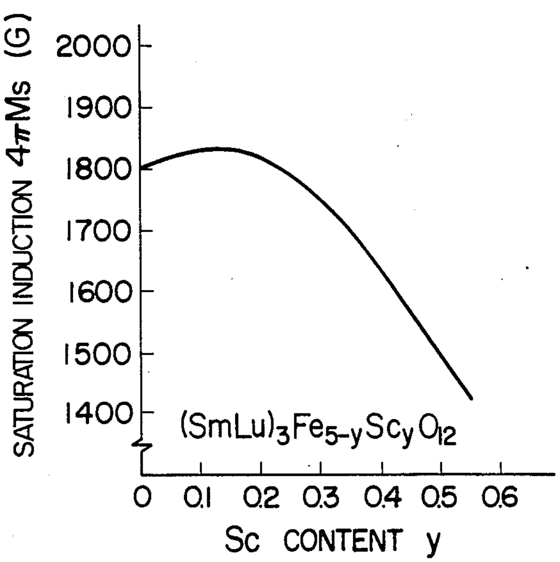
FIG. 1 is a plot of the Sc content y of a $(SmLu)_3Fe_{5-y}Sc_yO_{12}$ single crystal film versus the saturation induction $4\pi Ms$.
Figure 2:
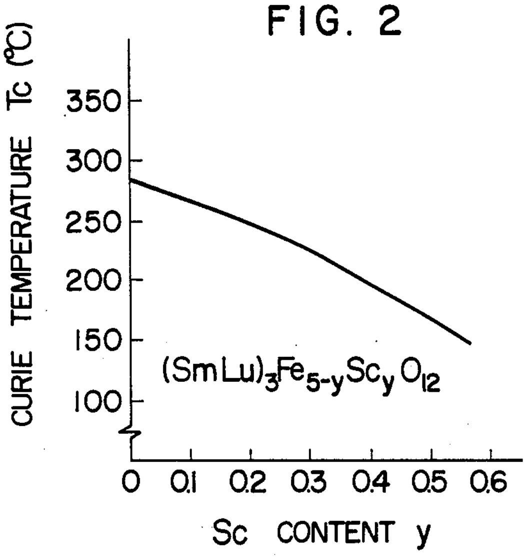
FIG. 2 is a plot of the Sc content y of a $(SmLu)_3Fe_{5-y}Sc_yO_{12}$ single crystal film versus the Curie temperature $T_c$.
Figure 3:
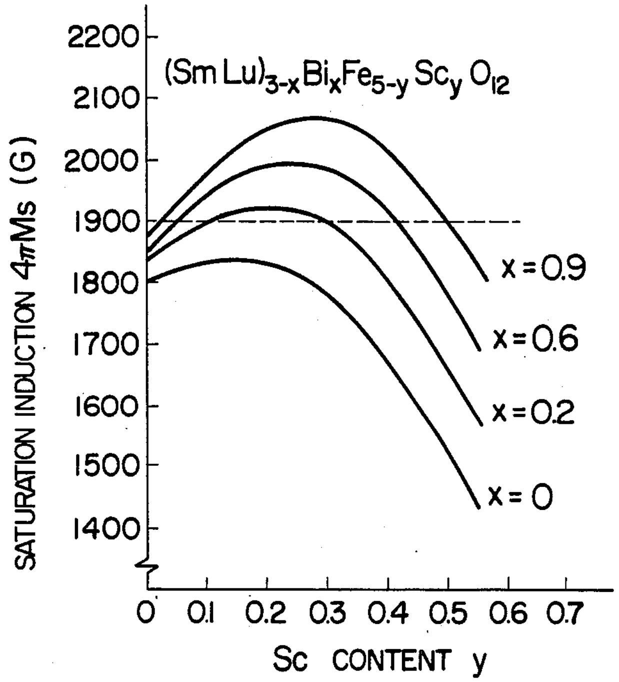
FIG. 3 plots the Bi content x and Sc content y of a $(SmLu)_{3-x}Bi_xFe_{5-y}Sc_yO_{12}$ single crystal film versus the saturation induction $4\pi Ms$.

FIG. 3 shows the Sc content y of $(SmLu)_{3-x}Bi_xFe_{5-y}Sc_yO_{12}$ Versus the $4\pi Ms$ at room temperature (25° C.) at Bi contents x of 0, 0.2, 0.6, and 0.9. These plots clearly show that the $4\pi Ms$ value when some $Bi^{3+}$ is present is higher than when $x=0$, and can be raised to 1900G or higher.

Figure 4:
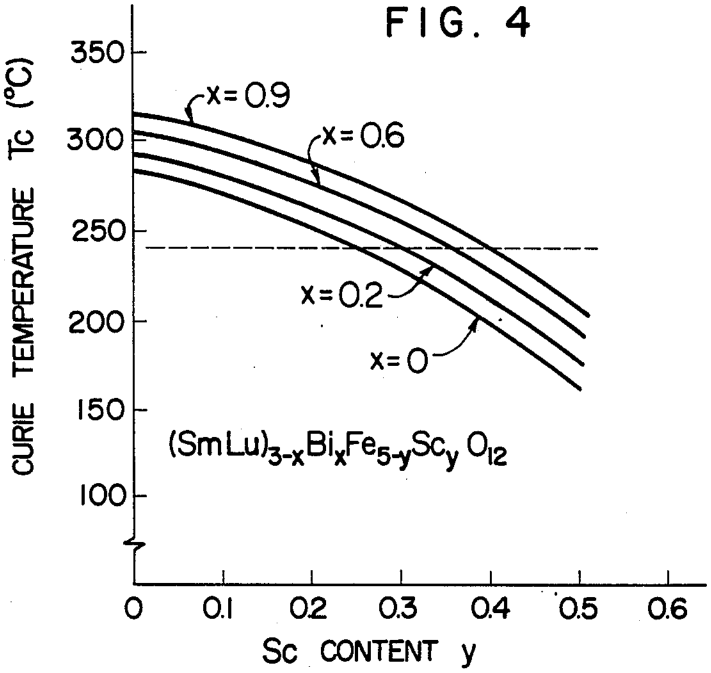
FIG. 4 plots the Bi content x and Sc content y of a $(SmLu)_{3-x}Bi_xFe_{5-y}Sc_yO_{12}$ versus the Curie temperature $T_c$.

FIG. 4 shows the Sc content y dependence of the Curie temperature $T_c$ for values of x ranging from 0 to 0.9. The Curie temperature decreases with increasing Sc content in each of the plots in this graph, but if the Sc content remains the same, the Curie temperature increases with the Bi content.

The Curie temperature is an important factor that sets the upper limit on the range in the operating temperature of bubble devices. In ion implanted devices that form a bubble driving layer by ion-implantation, the Curie temperature of the bubble driving layer drops about 50 degrees by ion implantation, making it necessary to start with a high Curie temperature. Garnet films containing bismuth are advantageous for this reason as well. The Curie temperature must be set at not less than 240° C. in order to make the upper limit of the operating temperature range at least 100° C.

Table 1 shows the magnetic properties of various garnet films (measurements taken at room temperature). These garnet films were all prepared by a well-known liquid phase epitaxial growth process at a temperature of 800° C–950° C. $Nd_3Ga_5O_{12}$ and $Sm_3Ga_5O_{12}$ single crystals were used as the substrate, and the garnet film grown on the (111) oriented substrate.

Sample No. I is a garnet film that does not contain dodecahedral $Bi^{3+}$. Octahedral ferric ions have been substituted by $Sc^{3+}$, but the Curie temperature is only 246° C., which is 39 degrees lower than the 287° C. when $Sc^{3+}$ is not substituted, and the saturation induction remains almost unchanged at 1820G. It was impossible for this reason to achieve a bubble diameter of 0.4 micron or less.

Sample No. II is a garnet film obtained by substituting some of the dodecahedral $Sm^{3+}$ and $Lu^{3+}$ in the garnet film of sample No. I with $Bi^{3+}$. The Curie temperature is 24 degrees higher than that for sample No. I, which contains no $Bi^{3+}$, and the saturation induction has increased consideralby to 1990G. The bubble diameter of this garnet film is 0.37 micron, which is less than 0.4 micron.

Sample No. III is a garnet film in which $In^{3+}$ was used in place of the $Sc^{3+}$ used in the garnet film in sample No. II to replace octahedral $Fe^{3+}$. Its properties are almost identical to those of sample No. II, and it was capable of supporting small bubbles with diameters of less than 0.4 micron.

The contents of bismuth and octahedral-substituting elements are extremely important in the present invention; to obtain desirable results, it is essential that these lie within given ranges. Table 2 gives the properties obtained at different values of the bismuth content x and the octahedral-substituting element content y in garnet films represented by the general formula $R_{3-x}Bi_xFe_{5-y}M_yO_{12}$ (where R is one or more elements selected from the group consisting of yttrium, lanthanum, samarium, thulium, ytterbium, and lutetium; M is at least one element selected from the group consisting of scandium, indium and chronium).

Whether a property is good or poor is denoted in Table 2 with an O or X. Samples for which the saturation induction was at least 1900G, in which small magnetic bubbles with diameters of 0.4 micron or less are stable, and with Curie temperatures of at least 240° C. are denoted by O, while those unable to meet these conditions are denoted by X.

TABLE 1

| Sample No. | Film composition | Film thickness h (μm) | Bubble diameter d (μm) | Saturation induction 4πM. (G) | Curie temp. Tc (°C.) | Substrate single crystal |
|---|---|---|---|---|---|---|
| I | $(Sm_{1.5}Lu_{1.5})(Fe_{4.8}Sc_{0.2})O_{12}$ | 0.43 | 0.43 | 1820 | 246 | $Sm_3Ga_5O_{12}$ |
| II | $(Sm_{1.4}Lu_{1.0}Bi_{0.6})(Fe_{4.8}Sc_{0.2})O_{12}$ | 0.37 | 0.37 | 1990 | 270 | $Nd_3Ga_5O_{12}$ |
| III | $(Sm_{1.3}Lu_{1.1}Bi_{0.6})(Fe_{4.8}In_{0.2})O_{12}$ | 0.37 | 0.37 | 2000 | 271 | $Nd_3Ga_5O_{12}$ |

TABLE 2

| Sample No. | Film composition | Substrate single crystal | x | y | Film thickness h(μm) | Bubble diameter d(μm) | Saturation induction 4πMs (G) | Curie temp. Tc (°C.) | Property or film (good/poor) |
|---|---|---|---|---|---|---|---|---|---|
| 1 | $Sm_{1.2}Lu_{1.6}Bi_{0.2}Fe_{4.7}Sc_{0.3}O_{12}$ | $Sm_3Ga_5O_{12}$ | 0.2 | 0.3 | 0.37 | 0.36 | 1900 | 241 | O |
| 2 | $Sm_{1.2}Lu_{1.6}Bi_{0.2}Fe_{4.9}Sc_{0.1}O_{12}$ | $Sm_3Ga_5O_{12}$ | 0.2 | 0.1 | 0.37 | 0.38 | 1905 | 278 | O |
| 3 | $Sm_{1.1}Lu_{1.0}Bi_{0.9}Fe_{4.97}Cr_{0.03}O_{12}$ | $Nd_3Ga_5O_{12}$ | 0.9 | 0.03 | 0.40 | 0.40 | 1905 | 313 | O |
| 4 | $Sm_{0.7}Lu_{1.4}Bi_{0.9}Fe_{4.6}Sc_{0.4}O_{12}$ | $Nd_3Ga_5O_{12}$ | 0.9 | 0.4 | 0.38 | 0.35 | 1990 | 240 | O |
| 5 | $Sm_{1.8}Lu_{0.7}Bi_{0.5}Fe_{4.66}Sc_{0.34}O_{12}$ | $Nd_3Ga_5O_{12}$ | 0.5 | 0.34 | 0.37 | 0.35 | 1920 | 242 | O |
| 6 | $Yb_{0.1}Sm_{1.3}Lu_{0.9}Bi_{0.7}Fe_{4.95}In_{0.05}O_{12}$ | $Nd_3Ga_5O_{12}$ | 0.7 | 0.05 | 0.40 | 0.39 | 1920 | 304 | O |
| 7 | $Sm_{1.1}Lu_{1.7}Bi_{0.2}Fe_{4.65}In_{0.35}O_{12}$ | $Sm_3Ga_5O_{12}$ | 0.2 | 0.35 | 0.36 | 0.35 | 1880 | 220 | X |
| 8 | $Sm_{1.9}Lu_{1.0}Bi_{0.1}Fe_{4.8}Sc_{0.2}O_{12}$ | $Nd_3Ga_5O_{12}$ | 0.1 | 0.2 | 0.45 | 0.44 | 1840 | 257 | X |
| 9 | $Sm_{1.4}Lu_{0.7}Bi_{0.9}Fe_{4.8}Sc_{0.2}O_{12}$ | $Nd_3Ga_5O_{12}$ | 0.9 | 0.2 | 0.38 | 0.37 | 2090 | 279 | O |
| 10 | $Sm_{2.0}Lu_{0.7}Bi_{0.3}Fe_{4.93}Sc_{0.07}O_{12}$ | $Nd_3Ga_5O_{12}$ | 0.3 | 0.07 | 0.43 | 0.43 | 1840 | 286 | X |
| 11 | $Sm_{1.2}Lu_{1.3}Bi_{0.6}Fe_{4.6}Sc_{0.4}O_{12}$ | $Nd_3Ga_5O_{12}$ | 0.6 | 0.4 | 0.34 | <0.34 | 1750 | 223 | X |
| 12 | $Y_{0.1}Sm_{1.9}Lu_{0.8}Bi_{0.2}Fe_{4.8}In_{0.2}O_{12}$ | $Nd_3Ga_5O_{12}$ | 0.2 | 0.2 | 0.37 | 0.38 | 1920 | 257 | O |
| 13 | $Sm_{1.0}Lu_{1.1}Bi_{0.9}Fe_{4.99}Cr_{0.01}O_{12}$ | $Nd_3Ga_5O_{12}$ | 0.9 | 0.01 | 0.41 | 0.42 | 1880 | 314 | X |
| 14 | $Sm_{1.5}Lu_{0.9}Bi_{0.6}Fe_{4.96}In_{0.04}O_{12}$ | $Nd_3Ga_5O_{12}$ | 0.6 | 0.04 | 0.43 | 0.43 | 1860 | 305 | X |
| 15 | $Sm_{1.2}Lu_{1.7}Bi_{0.1}Fe_{4.7}Sc_{0.3}O_{12}$ | $Sm_3Ga_5O_{12}$ | 0.1 | 0.3 | 0.39 | 0.40 | 1810 | 230 | X |
| 16 | $La_{0.1}Sm_{1.5}Lu_{0.9}Bi_{0.5}Fe_{4.8}Sc_{0.2}O_{12}$ | $Nd_3Ga_5O_{12}$ | 0.5 | 0.2 | 0.37 | 0.36 | 1980 | 268 | O |
| 17 | $La_{0.1}Sm_{2.1}Lu_{0.7}Bi_{0.1}Fe_{4.9}Sc_{0.1}O_{12}$ | $Nd_3Ga_5O_{12}$ | 0.1 | 0.1 | 0.42 | 0.42 | 1840 | 270 | X |
| 18 | $Sm_{0.9}Lu_{1.2}Bi_{0.9}Fe_{4.55}Sc_{0.45}O_{12}$ | $Nd_3Ga_5O_{12}$ | 0.9 | 0.45 | 0.36 | 0.36 | 1950 | 217 | X |

TABLE 2-continued

| Sample No. | Film composition | Substrate single crystal | x | y | Film thickness h(μm) | Bubble diameter d(μm) | Saturation induction 4πMs (G) | Curie temp. Tc (°C.) | Property or film (good/poor) |
|---|---|---|---|---|---|---|---|---|---|
| 19 | $Tm_{0.1}Sm_{1.4}Lu_{0.9}Bi_{0.6}Fe_{4.9}Sc_{0.1}O_{12}$ | $Nd_3Ga_5O_{12}$ | 0.6 | 0.1 | 0.38 | 0.37 | 1950 | 291 | O |

Figure 5:
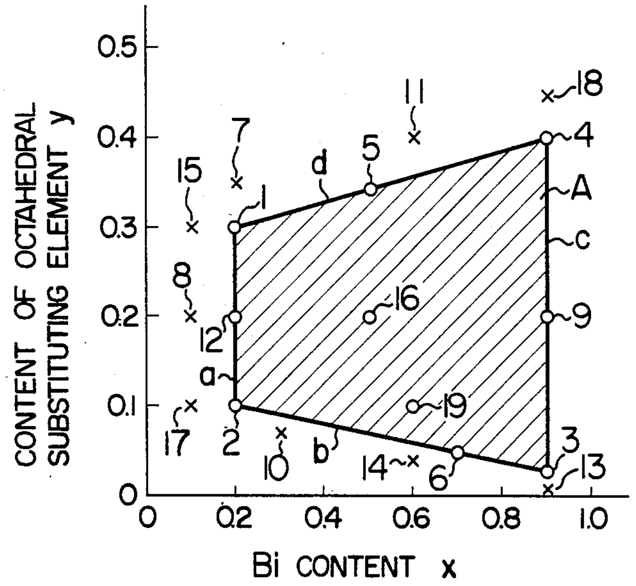
FIG. 5 shows the range of desirable values in the present invention for the Bi content x and the content y of the octahedral substituting elements.

The results in Table 2 are presented in FIG. 5 with x and y as the parameters. As in Table 2, the symbols O and X in FIG. 5 respectively indicate good and poor properties. The numbers associated with each symbol in the graph are the sample numbers used in Table 2.

It is apparent from FIG. 5 that, when the bismuth content x and octahedral-substituting element y lie in region A enclosed within line segments a, b, c, and d, saturation induction is at least 1900G, small bubbles with diameters of 0.4 micron or less are stable, and the Curie temperature is at least 240° C. However, when x and y are outside of region A, these conditions are not satisfied, making desirable properties unobtainable.

Thus, when x and y lie to the left of line segment a or below line segment b in FIG. 5, the bubble diameter becomes larger than 0.4 micron, and when these are above line segment d, the Curie temperature falls below 240° C. When x and y are to the right of line segment c, a good epitaxial film cannot be obtained on account of the large content of bismuth, which has a large ionic radius.

As is evident from the description given above, the present invention is capable of providing a saturation induction 4πMs of at least 1900G. Moreover, in magnetic garnet films in which the film thickness and the bubble diameter is almost identical, the bubble diameter can be made 0.4 micron or less. Lastly, a Curie temperature of over 240° C. can be obtained, and this garnet film is suitable for use even in ion implanted devices.

What is claimed is:

1. A garnet film for magnetic bubble memory element, having uniaxial anitropy and a composition represented by the following general formula:

$$R_{3-x}Bi_xFe_{5-y}M_yO_{12}$$

lanthanum, samarium, thulium, ytterbium, where R comprises both samarium and lutetium, with each of samarium and lutetium being included in the composition formula with at least 0.7 ions; M is at least one element selected from the group consisting of scandium, indium, and chromium; the values x and y lie within a region A enclosed by line segment a in FIG. 5 joining points 1 (0.2,0.3) and 2 (0.2,0.1), line semgment b joining points 2 (0.2,0.1) and 3 (0.9,0.03), line segment c joining points 3 (0.9,0.03) and 4 (0.9,0.4), and line segment d joining points 4 (0.9,0.4) and 1 (0.2,0.3); wherein said film exhibits a saturation induction 4πMs of at least 1,900 G at room temperature and is capable of supporting magnetic bubbles with a bubble diameter of 0.4 micron or less; wherein said film exhibits a Curie temperature of at least 240° C.; and wherein said garnet film is formed on the surface of (111) oriented non-magnetic garnet substrate.

2. The garnet film of claim 1, wherein said film has a thickness of 0.4 micron or less.

3. The garnet film of claim 1, wherein said film is a film formed by epitaxial growth.

4. The garnet film of claim 1 wherein R additionally comprises an element selected from the group consisting of yttrium, lanthanum, thulium and ytterbium.

5. The garnet film of claim 4, wherein said film has a thickness of 0.4 micron or less.

6. The garnet film of claim 1, wherein said film is formed by epitaxial growth.

* * * * *